United States Patent Office 3,457,040
Patented July 22, 1969

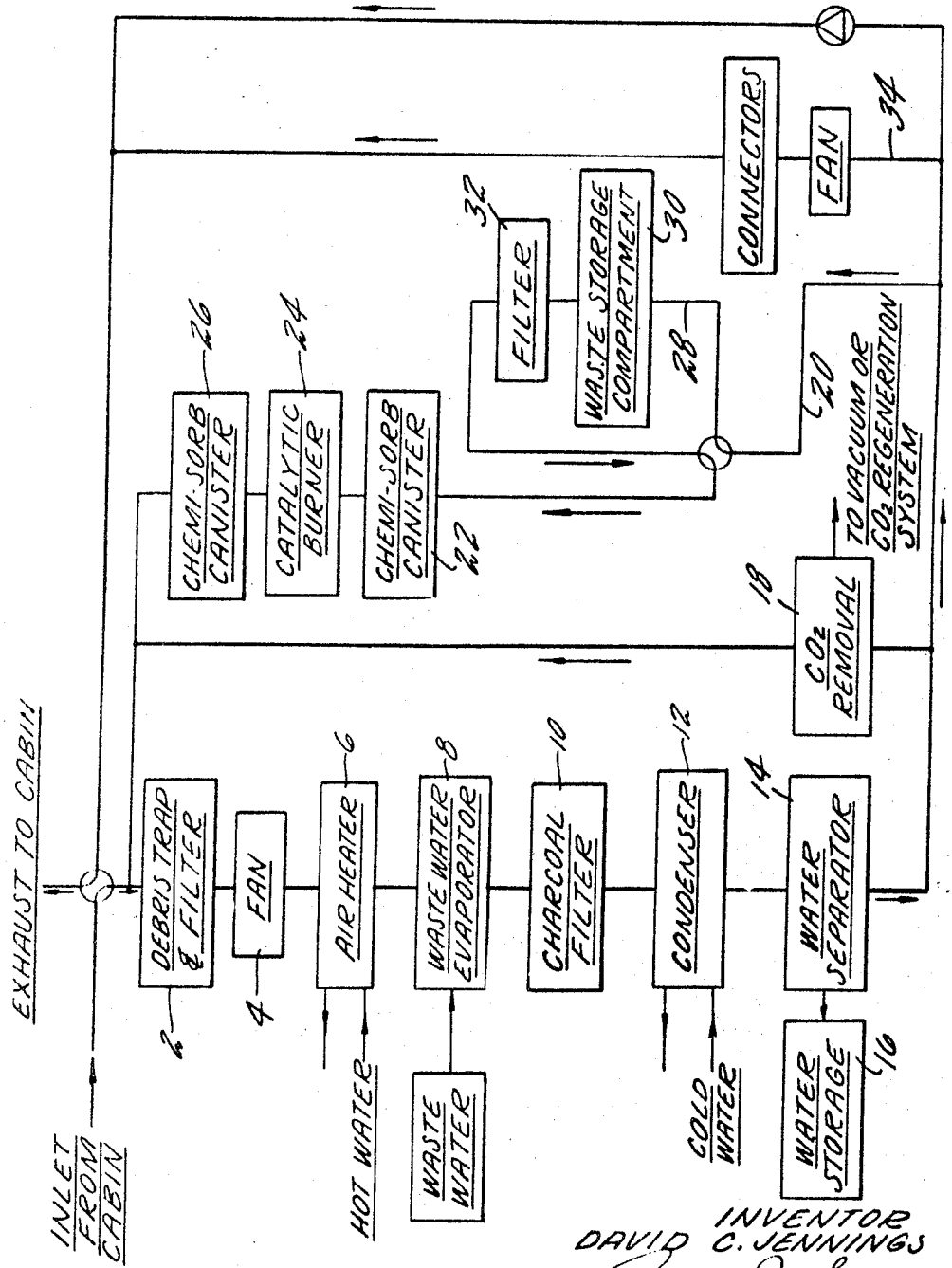

3,457,040
LIFE SUPPORT SYSTEM FOR MANNED SPACE VEHICLES
David C. Jennings, Windsor Locks, Conn., assignor to United Aircraft Corporation, East Hartford, Conn., a corporation of Delaware
Filed July 13, 1966, Ser. No. 564,815
Int. Cl. C01b 1/26; B01d 53/04
U.S. Cl. 23—204      1 Claim

ABSTRACT OF THE DISCLOSURE

A method is disclosed for processing metabolic waste in a manned spaced vehicle wherein the waste is stored in vapor permeable containers exposed to the cabin environmental air stream which is subsequently processed to remove all toxic and malodorous components therefrom by passage through a chemisorbent bed, a catalytic burner, activated charcoal, and a zeolite bed.

---

This invention relates in general to life support systems for manned space vehicles and, more particularly, to environmental air reconstitution systems for vehicles on space missions of long duration. It contemplates the inclusion of a metabolic waste processing subsystem as an integral part of such life support systems.

It is generally understood that a space vehicle destined for a manned space flight of extended duration will incorporate a hermetically sealed life support chamber or cabin. Since neither the waste gas nor the waste solids can be discharged overboard, the vehicle must contain means for reducing the waste products to their minimum volume. Additionally, depending on the anticipated length of the mission, means may advantageously be provided for effecting a relatively complete transformation of the waste matter into new supplies which may then be reused in one form or another. This transformation process requires the use of power and the general objective of current studies revolves about the development of improved processes and systems whereby the requisite transformations may efficiently be made with a minimum power expenditure in apparatus of minimum volume and weight.

It is an object of the present invention to provide a life support system wherein the total waste products of the human occupants of a manned space vehicle may be efficiently reduced to their minimum volume and weight.

An additional object is to provide means for efficiently transforming the metabolically generated waste matter into new, reusable supplies.

The need for a highly efficient life support system for long duration space missions can best be illustrated by considering a typical flight to Mars by a crew of six in an elasped time of 420 days. In a mission of this nature, if reliance were placed solely on stored supplies, the launching oxygen load would amount to approximately 5000 pounds. In addition, the crew would require an estimated 10,000–50,000 pounds of water for personal use during the mission. The weight penalty inherent in the nonregenerative system obviously dictates the use of apparatus for the regeneration of oxygen and for the reclamation and reuse of water.

Studies have indicated that on a mission such as that previously described, the occupants will produce approximately 1200 pounds of solid metabolic waste containing 800 pounds of water. The reclamation of this water for reuse not only serves to reduce the amount of makeup liquid required, but also effects a substantial volume reduction of the waste, significantly reducing the space required for its storage. Of course, if the reclaimed water is not to be reused, there is not much advantage to be obtained over a simple storage system since the capsule launching weight would remain virtually unchanged.

The preferred system for life support management in a space vehicle of the nature described can best be illustrated by reference to the drawing which shows a somewhat simplified schematic of a space capsule environmental air reconstitution system.

In such a system the exhaust air from the vehicle cabin is preferably first taken through a debris trap and filter arrangement 2, wherein the aerosols, dust, smoke and other solid and liquid particles are removed to prevent possible contamination of the chemical beds through which the stream is directed later in the flow cycle. A particularly useful form of debris trap includes a sponge lined vortex chamber which captures the large liquid droplets. A cartridge type filter is usually used to remove the larger of the solid particles and a highly efficient particulate filter, consisting, for example, of glass asbestos sheets closely pleated and separated by aluminum foil, is used to remove the remainder of the particles with a typical efficiency of 99 percent on particles of 0.3 micron size.

The cabin exhaust air, or breathable mixture of gases, is utilized in various subsystems to reclaim water, primarily through evaporation techniques, from urine, wash water and through humidity control. Consequently, the air is preferably forced by a fan 4 through an air heater 6 wherein it is heated to about 160° F. prior to circulation through a wick-type evaporator 8 in the waste water reclamation subsystem. The water vapor and air then pass through an activated charcoal filter 10 wherein the heavy molecule contaminants are removed, the charcoal bed being positioned between the evaporator 8 and a condenser 12 in order to serve the dual purpose of deodorizing the air stream and recovered water which passes therethrough in vapor form. Although some of the water condenses in the bed thereby reducing its efficiency, the advantage of purifying both water and air in a single bed outweighs this disadvantage.

The use of activated charcoal for contaminant control is particularly attractive since it is capable of removing most of the contaminant gases that may be expected to exist in the cabin air, including many malodorous compounds that exist only in trace amounts. Moreover, these beds are very stable and do not deteriorate with time and, in addition, the unit is inherently compact and efficient, and contains no moving parts.

The output from the charcoal bed is directed into the condensing heat exchanger 12 wherein the air is cooled to approximately 45° F., resulting in condensation of most of the water contained in the air-stream, and providing a convenient source for the necessary cabin cooling. This mixture of air and water droplets then flows into a stream driven rotary separator 14 where the free moisture in the stream is removed and sent to storage 16. From the separator the air, now dehumidified and cooled, flows back into the cabin.

The contaminant control subsystem typically operates in bypass loops which take flow from the main stream just downstream of the water separator and return it upstream of the debris trap. This contaminant control subsystem is a major life support item and is needed to maintain a purified, breathable atmosphere by removing those contaminants, including carbon dioxide, constituting a toxic hazard or which otherwise require control. It must deal with a wide variety of compounds, produced both metabolically and from other sources, before they can build up to toxic levels.

After the air has left the water separator, the flow splits with roughly one-half going to the carbon dioxide removal and regeneration phase 18 of the contaminant removal subsystem (if regeneration is provided), the rest flowing back to the cabin for reuse. In the preferred carbon dioxide removal system, the air is thoroughly dried in silica gel canisters to remove all moisture which would overload the zeolite beds to which the air subsequently flows and wherein the carbon dioxide removal is effected. The carbon dioxide-free air then is readmitted to the main stream for subsequent re-introduction to the cabin.

The water removed in the silica gel canisters is recovered and returned to the airstream as required for humidity control. The carbon dioxide removed in the zeolite bed is desorbed from the zeolite during another portion of the operating cycle and sent to a carbon dioxide accumulator. A $CO_2$ reduction system incorporating a solid electrolyte may be employed to reclaim the oxygen from the carbon dioxide, the oxygen thus formed being readmitted to the airstream for reuse.

Another phase of the contaminant control subsystem operates in a second bypass loop 20 arranged in parallel with the carbon dioxide removal subsystem. A small portion of the air flow, depending upon the contaminant level, is passed through a chemisorbent bed 22 which is used to remove those contaminants which cannot be readily adsorbed on activated charcoal or cannot be completely oxidized in a catalytic burner of the type hereinafter described. Those components which are to be removed in the chemisorbent beds are principally the sulfur and nitrogen compounds, halogens, and metal hydrides and, in addition, any trace compounds which might poison the catalyst in the catalytic burner. Since a large number of different contaminants are to be removed, the chemisorbent canister will normally consist of several layers of materials, each of which is designed to remove a specific contaminant or group of contaminants.

The removal of ionic contaminants, of which ammonia is the principal ingredient, and usually the only one removed by the chemisorbent bed which is present in greater than trace amounts, may be accomplished by contact with a cationic resin, one known commercially as "Amberlyst" having been successfully employed for this purpose. The trace amounts of acidic and basic gases are generally absorbed either in lithium hydroxide or on acid washed silica gel, depending on their particular chemical characteristics. Removal of the active metals is effected by passage through a silver coated molecular sieve wherein the sulfur compounds are deposited as sulfides. The polar and nonpolar solvents, such as trichloroethylene and propylene, can be dissolved in liquids held on a porous substrate such as powdered charcoal. Particularly suitable liquids for this purpose include mineral oil for the nonpolar solvents, and a glycol of high molecular weight for the polar solvents. The various nitrogen oxides are generally not removed in the chemisorbent bed but are accommodated in the carbon dioxide removal subsystem.

A catalytic burner 24 is utilized to keep under control those contaminants which are not readily removed either in the activated charcoal bed or in the chemisorbent beds, principally carbon monoxide, hydrogen and methane. These may all be present in significantly large quantities. As is well known in the art, these gases can be reacted in the presence of a catalyst to form carbon dioxide and water vapor, which are readily controllable by other components in the system. Tests have indicated that the portion of flow which passes through the chemisorbent bed should preferably be heated to 550° F. in the catalytic burner prior to exposure to the catalyst, and electrical heating elements may be advantageously provided in the burner for this purpose. Any catalyst which will promote oxidation is usable in this apparatus and rhodium-alumina has been shown to be particularly efficacious in this regard. Absorption of the products emanating from the catalytic burner can be readily accomplished in a chemisorbent bed 26 positioned downstream of the burner, or in other system components as hereinafter discussed.

The solid waste processing subsystem is interposed in a secondary bypass loop 28 just upstream of the first chemisorbent bed. The solid waste matter is collected in vapor permeable bags, which may comprise any conventional semi-permeable material, such as nitrocellulose or parchment, and the bags are hung in a waste storage compartment 30 through which a portion of the gas stream is circulated.

The waste storage compartment 30 may consist of a simple metallic casing with a number of hinged doors for insertion of the waste-filled bags, and an inlet and outlet connected to the environmental control system. A plurality of screens appropriately spaced so as to provide for the free passage of air around the stored bags may be utilized to maintain the bags in position in a zero gravity environment. Nets encircling the bags and hooked to the respective screens are used to hold the bags firmly in position during space maneuvers. It will be understood that the particular structural details of the compartment are relatively immaterial, it being necessary merely to store the bags in the airstream in such manner that free air circulation therearound is permitted and inward flow is maintained. The effluent from the compartment is fed to the trace contaminant removal subsystem and treated as previously discussed.

Storage of the metalbolic waste material in vapor permeable but waterproof containers permits putrefraction to take place by normal bacterial action while at the same time effecting gradual desiccation because of the passage of gas of relatively low humidity therearound. The vapors and gasses produced in the putrefaction process consist primarily of carbon dioxide and water vapor but may include appreciable quantities of methane. These are readily handled by the components already provided in the system together with any odors emanating from the bags. The production rate of contaminants is low and, accordingly, no significant adjustment of component size or capacity is required with respect to the system, nor are any new components necessary.

In actual practice, the storage compartment will be louvered and designed so that flow is always inward when the access doors to the compartment are opened during storage of additional waste material. For aseptic reasons, all handling of the vapor permeable containers themselves will normally be done with disposable plastic gloves which may then be disposed of in the same compartment after use.

A filter 32 downstream of the compartment prevents downstream contamination of other components in the event of bag rupture.

While the addition of germicidal materials, such as iodophor which consists of a complex formed by the attachment of iodine to large, surface active organic molecules, would have the effect of inhibiting the rate of putrefaction, they may be utilized in the system as desired. Furthermore, by careful control of the quantity of germicide added, the putrefaction mechanism may be adjusted as far as its rate is concerned, to conform to the parameters established for a given system.

Makeup for the breathable constituents lost and unrecoverable in the regeneration and reclamation subsystems is provided from cryogenic storage (not shown). The nitrogen makeup generally required is simply that needed to compensate for leakage which may be roughly 0.05 pound per hour. Oxygen makeup will essentially equal the difference between the metabolic oxygen intake and the amount recoverable from the carbon dioxide in the carbon dioxide reduction system, which is estimated to be approximately 0.12 pound per hour for the aforesaid six man crew.

In some system arrangements and, particularly during selected phases of a mission such as launch or re-entry, the crew is afforded the backup protection of a space suit to guard against the adverse effects of a sudden decompression in the event of a rupture in the cabin containment structure. In such circumstances a portion of the environmental air may be passed through the various space suits for cooling purposes. The preferred system accordingly shows, in schematic, a third bypass loop 34 wherein connections to suit connectors may be made.

For the sake of simplicity in presentation, the bulk of the valving, the redundant subsystems and various bypass loops provided around various units, have been omitted in the drawing. The particular valving employed in a given system, however, will be evident to those skilled in the art.

It will be apparent that, in the above-described system, there has been provided a versatile environmental life support system which is particularly adapted to space missions of long duration. While the various components and subsystems have been described in connection with particular preferred embodiments and in a most preferred sequence, modifications thereto will be evident to those skilled in the art within the true spirit of the invention as set forth in the appended claim.

What is claimed is:
1. In a manual space vehicle having an environmental air reconstitution system, the method of reducing the weight and volume of the metabolically generated solid waste comprising the steps of:
collecting the waste in vapor permeable containers;
exposing the containers to the exhaust air stream from the vehicle cabin to effect desiccation of the waste;
circulating the effluent stream through a chemisorbent bed to remove the contaminants that cannot be readily adsorbed on activated charcoal or oxidized in a catalytic burner;
circulating the stream through a catalytic burner to oxidize the carbon monoxide, hydrogen and hydrocarbon gases to carbon dioxide and water;
passing the stream through a bed of activated charcoal;
separating the water from the effluent stream and collecting the same for reuse;
directing the stream through a zeolite bed to remove the carbon dioxide;
and returning the purified air to the vehicle cabin.

References Cited
UNITED STATES PATENTS

| | | | |
|---|---|---|---|
| 2,882,243 | 4/1959 | Milton | 252—455 |
| 3,127,243 | 3/1964 | Konikoff | 23—204 |

EARL C. THOMAS, Primary Examiner

H. S. MILLER, Assistant Examiner

U.S. Cl. X.R.

23—260